United States Patent [19]
Hill

[11] Patent Number: 6,109,346
[45] Date of Patent: Aug. 29, 2000

[54] WASTE HEAT AUXILIARY TANK SYSTEM METHOD AND APPARATUS

[76] Inventor: Gary G. Hill, 3825 46th Northeast, Seattle, Wash. 98105-5219

[21] Appl. No.: 09/234,088

[22] Filed: Jan. 19, 1999

Related U.S. Application Data

[60] Provisional application No. 60/071,887, Jan. 20, 1998.

[51] Int. Cl.[7] .............................. G05D 23/00; F24H 7/04
[52] U.S. Cl. .............................. 165/297; 165/41; 165/51; 165/108; 239/129; 239/130; 236/34.5; 123/557; 237/12.3 B
[58] Field of Search ............................... 165/297, 41, 51, 165/108; 236/34.5, 37; 239/129, 130; 123/557; 237/12.3 B

[56] References Cited

U.S. PATENT DOCUMENTS

| | | | |
|---|---|---|---|
| 3,341,081 | 9/1967 | King | 236/34.5 |
| 3,398,891 | 8/1968 | Horne | 165/297 |
| 3,913,543 | 10/1975 | Richard | 123/557 |
| 3,989,019 | 11/1976 | Brandt et al. | 123/557 |
| 4,260,011 | 4/1981 | Brown | 236/34.5 |
| 4,284,127 | 8/1981 | Collier et al. | 165/51 |
| 4,338,891 | 7/1982 | Blitz | 165/51 |
| 4,351,301 | 9/1982 | Allen | 123/557 |
| 4,393,851 | 7/1983 | Gorans | 123/557 |
| 4,593,753 | 6/1986 | McConnell | 165/51 |

FOREIGN PATENT DOCUMENTS

| | | | |
|---|---|---|---|
| 2486154 | 1/1982 | France | 123/557 |
| 4-33014 | 2/1992 | Japan | 165/108 |
| 6-74110 | 3/1994 | Japan | 123/557 |

*Primary Examiner*—John K. Ford
*Attorney, Agent, or Firm*—William G. Forster

[57] ABSTRACT

A waste heat auxiliary tank system is provided for transferring heat from the coolant of an internal combustion engine to process water contained in an auxiliary water storage tank. The waste heat auxiliary tank system operates by drawing coolant from the engine of a truck, diverting the coolant through a common heat exchanger of the type employing coils, tubes or the like, and pumping process water through the heat exchanger, where heat is transferred from the coolant to the process water, to an auxiliary water storage tank for storing the hot process water on the truck. Importantly, the waste heat auxiliary tank system includes at least one automatically activated multiport thermostatically controlled diverter valve. The diverter valve includes an inlet port for receiving coolant from the engine, a first outlet port for diverting coolant directly back to the engine, and a second outlet port for diverting coolant to the coolant inlet of said heat exchanger. In accordance with the present invention, the diverter valve is responsive to coolant temperature changes relative to a predetermined engine operating temperature such that when the coolant temperature is below the predetermined operating temperature, coolant is directed out the first outlet port: back to the engine; and such that when the coolant temperature is above the predetermined diverting temperature, the same is directed out the second outlet port: to the heat exchanger inlet.

12 Claims, 7 Drawing Sheets

WASTE HEAT AUXILIARY TANK SYSTEM METHOD AND APPARATUS

This application claims the benefit of U.S. Provisional Application Ser. No. 60/071,887 filed Jan. 20, 1998.

BACKGROUND

This invention relates generally to vehicle engine cooling systems and more particularly to a method and apparatus for extracting and using the waste heat thereof.

A number of systems have been invented to extract heat from the liquid cooling circuit of a vehicle engine. Many of the early designs incorporate simple thermostats that direct coolant to a radiator or heater as the coolant temperature rises. For example in 1955, U.S. Pat. No. 2,706,085 issued to Nallinger disclosing a thermostatic regulating device that directs heated coolant to either a radiator or heater depending on the temperature of the coolant. Similarly, in 1966, U.S. Pat. No. 3,246,637 issued to Walsh illustrating a thermostatically controlled cross flow engine radiator with a thermostat controlling the flow direction of coolant depending on coolant temperature. Although each of these designs are provided to keep engine coolant at a predetermined temperature, neither is directed to extracting heat from the coolant to heat water in an auxiliary storage tank.

A few subsequent designs were directed to extracting heat from the engine coolant to heat other equipment. For example in 1970 U.S. Pat. No. 3,521,704 issued to Bridegum disclosing a heat exchanger for recreational vehicles where engine coolant flows through a heat exchanger to heat water in a water storage tank. In 1972 U.S. Pat. No. 3,645,327 issued to Henley disclosing a pipe disposed in a hot water radiator tank for extracting heat therefrom to heat storage water in a separate tank. U.S. Pat. No. 4,162,670, issued in 1979 is directed to a system to extract heat from engine coolant to heat a food warmer assembly. Also U.S. Pat. No. 4,154,669 issued in 1979 discloses a system that extracts heat from engine coolant to heat a secondary water circuit. Each of these designs, however, do not incorporate any means to regulate the amount of heat extracted from the engine coolant to protect the vehicle engine from operating at a improper temperature.

Other more recent designs include U.S. Pat. No. 4,422,572 issued in 1983 which discloses an engine cooling water circulation system that employs a two way valve therein. U.S. Pat. No. 4,556,171 issued in 1985 disclosing a heating system for automobiles with a heat storage tank including electromagnetic valves for selectively introducing the engine cooling water from the engine and the heat accumulating water into the heating radiator. U.S. Pat. No. 4,562,890 issued in 1986 disclosing an apparatus for warming window washer liquid by wrapping the washer hoses around the engine coolant hose. In addition, U.S. Pat. Nos. 5,211,334 and 5,407,130 issued in 1993 and 1995 respectively illustrate heat storage devices for use with motor vehicles wherein each employ a combination of valves to control the flow liquids within the system.

Although the above noted prior art inventions, provide various methods and systems to extract and utilize heat from the coolant of an internal combustion engine, none of the same are directed to, or teach a simple, low maintenance method for extracting heat from the coolant of an engine to heat process water stored in a storage tank while automatically maintaining the proper temperature levels of the coolant and the process water.

Accordingly, a need remains for an inexpensive system designed to safely and automatically extract heat from the coolant of an engine's coolant system to heat process water in an auxiliary water storage tank, while maintaining the engine coolant at its proper temperature for cooling the vehicle engine, and while maintaining the process water at its predetermined desired temperature.

SUMMARY

One object of the invention is to provide heated water in an auxiliary water tank disposed on a concrete delivery truck.

A second object is to protect a truck's engine as heat is transferred therefrom to an auxiliary water tank disposed on the truck.

Another object is to minimize the expense of providing a heated water source on a concrete delivery truck.

Yet another object is to efficiently transfer heat from the coolant of a truck's internal combustion engine to process water contained in an auxiliary water storage tank disposed on the truck.

A further object is to automatically control the heat transfer to an auxiliary water storage tank on a truck from the engine thereof.

Still another object is to minimize the maintenance required by a system that transfers heat from a concrete delivery truck's engine to a auxiliary water storage tank disposed on the truck.

The invention is waste heat auxiliary tank system for transferring heat from the coolant of an internal combustion engine to process water contained in an auxiliary water storage tank. Typically, a source of hot water must be maintained on concrete trucks for several reasons including cleaning the equipment with hot water following a concrete pour, and adding hot water to the concrete mix to deliver the same within a predetermined temperature range and slump. Accordingly, a waste heat auxiliary tank system is provided to supply and maintain hot water in an auxiliary water storage tank disposed on the truck.

The waste heat auxiliary tank system operates by drawing coolant from the engine of a truck, diverting the coolant through a common heat exchanger of the type employing coils, tubes or the like, and pumping process water through the heat exchanger, where heat is transferred from the coolant to the process water, to an auxiliary water storage tank for storing the hot process water on the truck.

In the preferred embodiment the heat exchanger comprises a coolant inlet for receiving coolant at a predetermined temperature, and a coolant outlet for discharging the coolant for return to the engine. Similarly, the heat exchanger includes a process water inlet for receiving process water from the auxiliary water storage tank, and a process water outlet for discharging process water for return to the auxiliary water storage tank.

Importantly, the waste heat auxiliary tank system includes at least one automatically activated multiport thermostatically controlled diverter valve. The diverter valve includes an inlet port for receiving coolant from the engine, a first outlet port for diverting coolant directly back to the engine, and a second outlet port for diverting coolant to the coolant inlet of said heat exchanger. In accordance with the present invention, the diverter valve is responsive to coolant temperature changes relative to a predetermined engine operating temperature such that when the coolant temperature is below the predetermined operating temperature, coolant is directed out the first outlet port: back to the engine; and such that when the coolant temperature is above the predetermined diverting temperature, the same is directed out the second outlet port: to the heat exchanger inlet.

The diverter valve is disposed between the engine coolant outlet and the heat exchanger's coolant inlet. In this way, the diverter valve automatically controls the flow of engine coolant responsive to fluid temperatures, to a preferred and selected location: either back to the engine or to the heat exchanger.

In another aspect of the invention, a second diverter valve is provided. The second diverter valve includes an inlet port for receiving a continuous flow of process water from the auxiliary water storage tank, a first outlet port for diverting process water to the heat exchanger storage tank, and a second outlet port for diverting process water back to the auxiliary water storage tank. The second diverter valve is responsive to process water temperature changes relative to a predetermined temperature such that when the process water temperature is below the predetermined temperature, process water is directed out the first outlet port: to the heat exchanger; and such that when the process water temperature is above the predetermined temperature, process water is directed out the second outlet port: back to the auxiliary water storage tank.

The second diverter valve is disposed between the auxiliary water storage tank and the heat exchanger, for controlling the flow of process water therebetween. The second diverter valve controls the flow of process water, responsive to fluid temperatures, such that process water is either directed to the heat exchanger, or directed back through the auxiliary water storage tank.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF PREFERRED EMBODIMENT

Figure 1:
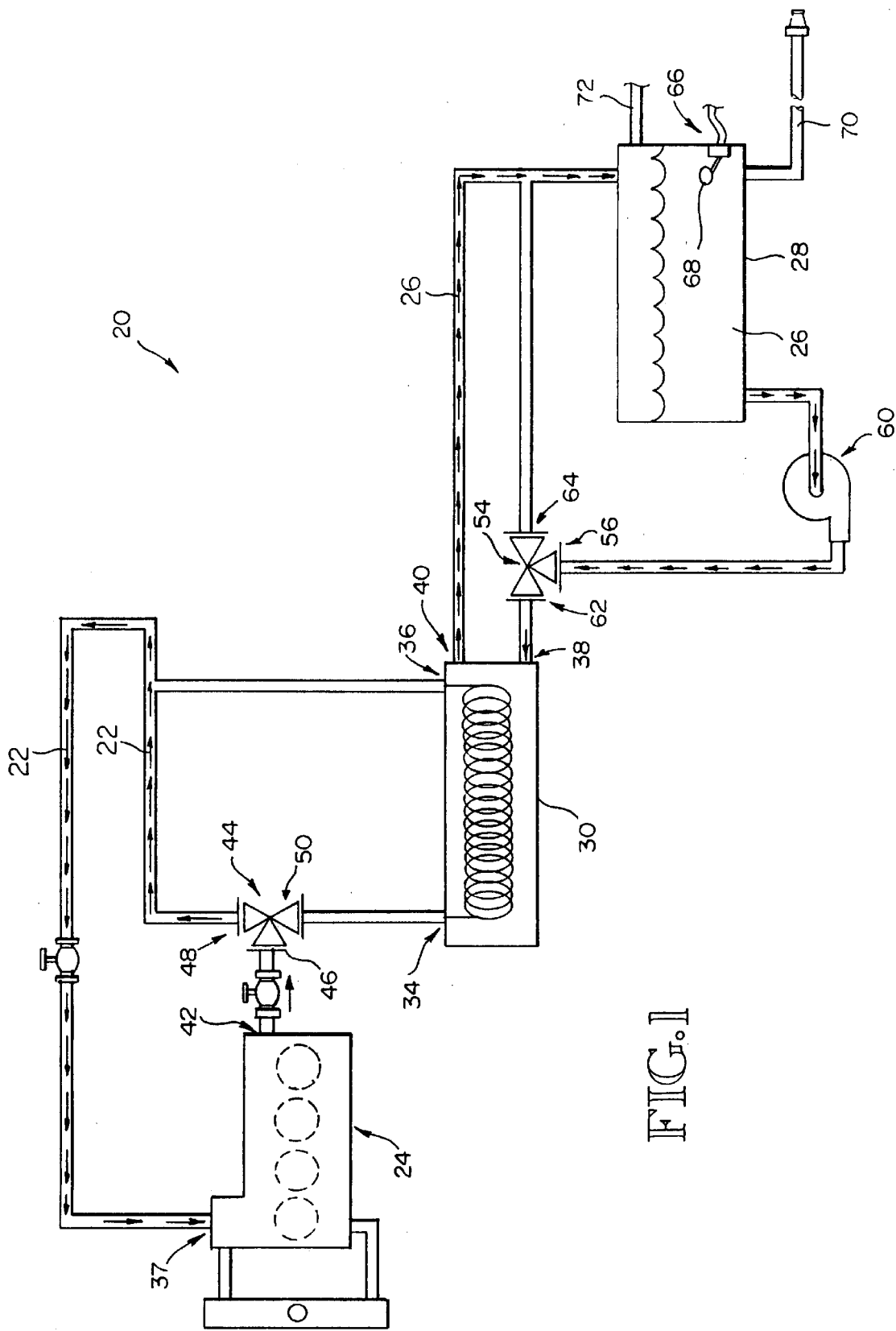
FIG. 1 is a simplified schematic view illustrating the operation of a waste heat auxiliary tank system during initial start-up of a cold engine, the arrows indicating the direction of fluid flow. In this situation the engine coolant flows from the engine through the inlet port of an automatically activated multi-port thermostatically controlled diverter valve having a closed thermostate which diverts the flow of coolant through the first outlet port thereof, to bypass the heat exchanger, for direct return to the engine coolant inlet of the engine. Also, process water is pumped from the auxiliary water storage tank through a second diverter valve which directs the same through the heat exchanger and back to the auxiliary water storage tank.

FIGS. 1 through 6 illustrate a waste heat auxiliary tank system 20 that is provided for transferring heat from the coolant 22 of an internal combustion engine 24 to process water 26 that is contained in an auxiliary water storage tank 28. In general, the waste heat auxiliary tank system 20 comprises a heat exchanger 30 having a coolant inlet 34 for receiving coolant 22 at a predetermined temperature, and a coolant outlet 36 for discharging the coolant 22 for return to the engine coolant inlet 37 of engine 24.

Additionally, the heat exchanger 30 includes a process water inlet 38 and a process water outlet 40. The process water inlet 38 is provided for receiving process water 26 from the auxiliary water storage tank 28. The process water outlet 40 is provided for discharging process water 26 for return to the auxiliary water storage tank 28.

Importantly, an automatically activated multi-port thermostatically controlled diverter valve 44 is disposed to receive coolant 22, flowing from an engine coolant outlet 42, of the engine 24, through an inlet port 46. From there, the coolant 22 flows to either a first outlet port 48 for diverting coolant 22 directly back to the engine 24, to speed engine warm-up, or to a second outlet port 50 for diverting coolant 22 to the coolant inlet 34 of the heat exchanger 30 to heat the process water 26.

In the preferred embodiment, the diverter valve 44 diverts coolant 22 to either the first outlet port 48 or to the second outlet port 50 responsive to the temperature of the coolant 22. For example, if the coolant temperature is below the normal engine "predetermined" operating temperature, the diverter valve 44 responds by directing coolant 22 out the first outlet port 48: back to the engine 24. It should be noted that normal engine "predetermined" operating temperature is determined by the specifications given by the engine manufacturer and is typically in the range of 160 degrees to 190 degrees. Similarly, if the coolant temperature has reached the predetermined operating temperature, the diverter valve 44 responds by directing coolant 22 out the second outlet port 50, to the coolant inlet 34 of the heat exchanger 30.

In addition to diverter valve 44, another similarly constructed second diverter valve 54 is provided. The second diverter valve 54 is disposed to receive process water 26 through an inlet port 56. The process water 26 is so received from a centrifugal pump 60 which pumps the process water 26 from the auxiliary water storage tank 28 to the second diverter valve 54. After the process water 26 is received into the diverter valve 54, the same flows to either a first outlet port 62 for diverting process water to the process water inlet 38 of heat exchanger 30, or alternatively to a second outlet port 64 for diverting process water 26 directly back to the auxiliary water storage tank 28.

In the preferred embodiment, the second diverter valve 54 diverts process water 26 to either the first outlet port 62 or to the second outlet port 64 responsive to the temperature of the process water 26. For example, if the process water is below the preferred "process temperature", which is typically 130 degrees +/−, the second diverter valve 54 responds by directing process water 26 out the first outlet port 62 to the process water inlet 38 of the heat exchanger 30 where the process water 26 is heated. Similarly, if the process water temperature has reached the preferred "process temperature", the second diverter valve 54 responds by directing process water 26 out the second outlet port 64: directly back to the auxiliary water tank 28.

Considering now in more detail the structure and components of a waste heat auxiliary tank system 20, a primary feature of the preferred embodiment is the automatic response of the diverter valves 44 and 54 according to the temperature of the fluid flowing therethrough. For this purpose, both diverter valves are constructed from well known, readily available components commonly used in mechanical piping systems. In the preferred embodiment, the diverter valves are thermostatic valve assemblies designed and manufactured by Fluid Power Energy Inc. of Milwaukee Wis. Typically, diverter valves employ an ordinary thermostat disposed within a valve body, the thermostat moving responsive to temperature changes alter or redirect the flow from one outlet port to another. Such diverter valves can be ordered/purchased with the proper thermostat to operate and respond to a specific, specified temperature to so direct or redirect fluid flows.

Directing attention to FIGS. 1 through 6, a series of illustrations are provided to show the primary combinations of fluid flow paths of coolant 22 and process water 26 at various coolant temperatures and process water temperatures. In FIG. 1, a simplified schematic view is illustrated showing the operation of a waste heat auxiliary tank system 20 during initial start-up of a cold engine 24. The arrows indicate the direction of fluid flow. In this situation, engine coolant 22 flows from the engine coolant outlet 42, from engine 24, through the inlet port 46 of diverter valve 44, having a closed thermostat (not illustrated), to divert the flow of coolant 22 through the first outlet port 48. In this way, the coolant 22 bypasses the heat exchanger 30, for direct return to the engine coolant inlet 37 the engine 24. In addition, process water 26 is pumped from the auxiliary water storage tank 28 through a second diverter valve 54 which directs the same to the heat exchanger 30 and back to the auxiliary water storage tank 28. More specifically, process water 26 is received into inlet port 56 where it is diverted through the first outlet port 62 to the process water inlet 38 of heat exchanger 30. After gaining heat from the heat exchanger 30, the process water 26 then exits through the process water outlet 40 to return to the auxiliary water storage tank 28. It should be noted that the heat exchanger 30 is a readily available "off-the-shelf" component. One such source for this component is the Young Radiator Company: Model # F-301-HY-4P.

Figure 2:
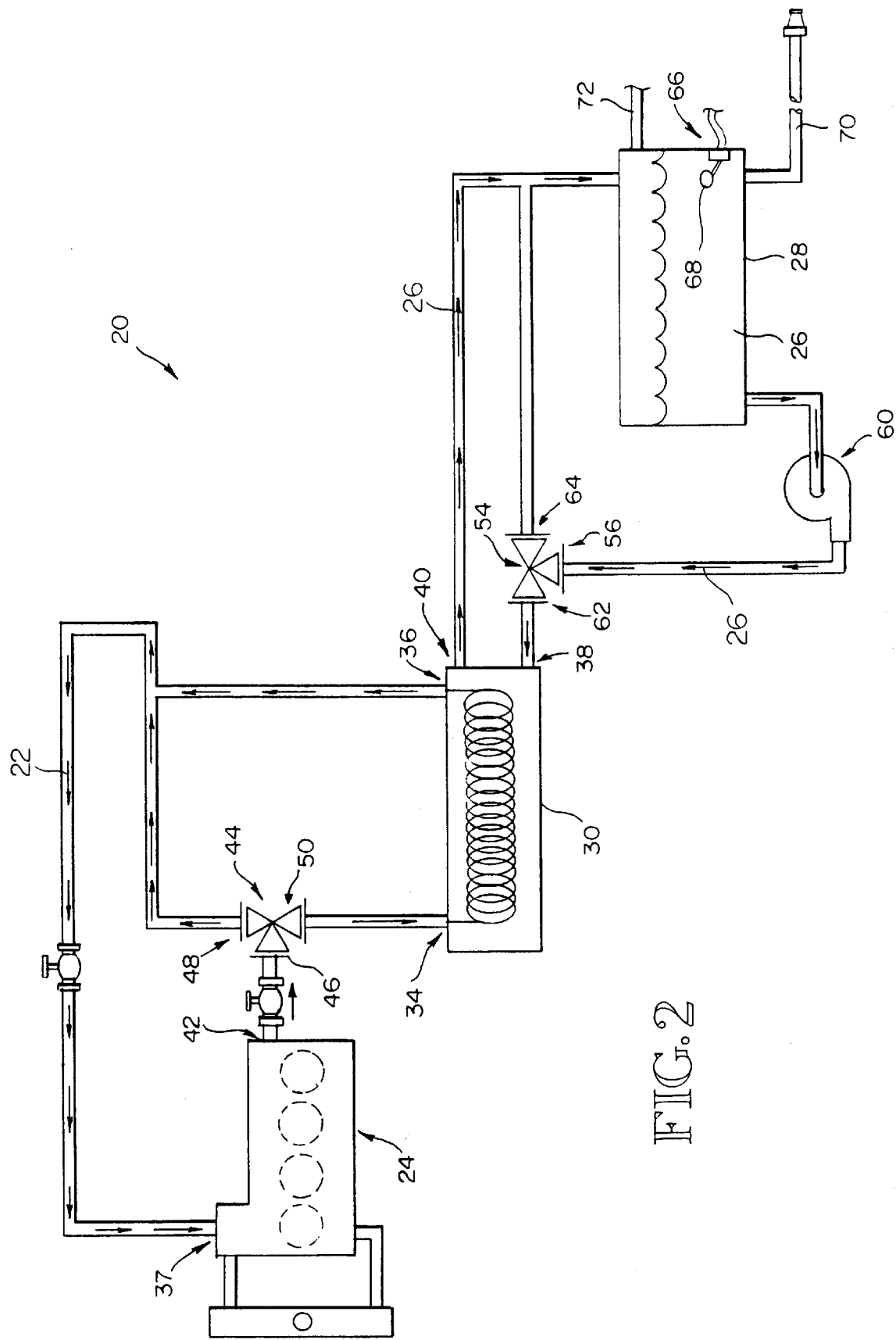
FIG. 2 is a simplified schematic view illustrating the operation of a waste heat auxiliary tank system during the engine warming-up phase, the arrows indicating the direction of fluid flow. In this situation, engine coolant flows from the engine through a diverter valve having a partially open thermostat which causes coolant to flow through a first outlet port directly back to the engine, and also through a second outlet port to the coolant inlet of the heat exchanger. Also, process water is pumped from the auxiliary water storage tank through a second diverter valve through the heat exchanger, and from there back to the auxiliary water storage tank.

FIG. 2 illustrates the engine warming-up phase wherein coolant 22 flows from the engine 24 through diverter valve 44 having a partially open thermostat (not illustrated), wherein coolant 22 flows through a first outlet port 48 directly back to the engine 24, and also through a second outlet port 50 to the coolant inlet 34 of the heat exchanger 30. In this situation, the process water flow is as illustrated in FIG. 1.

Figure 3:
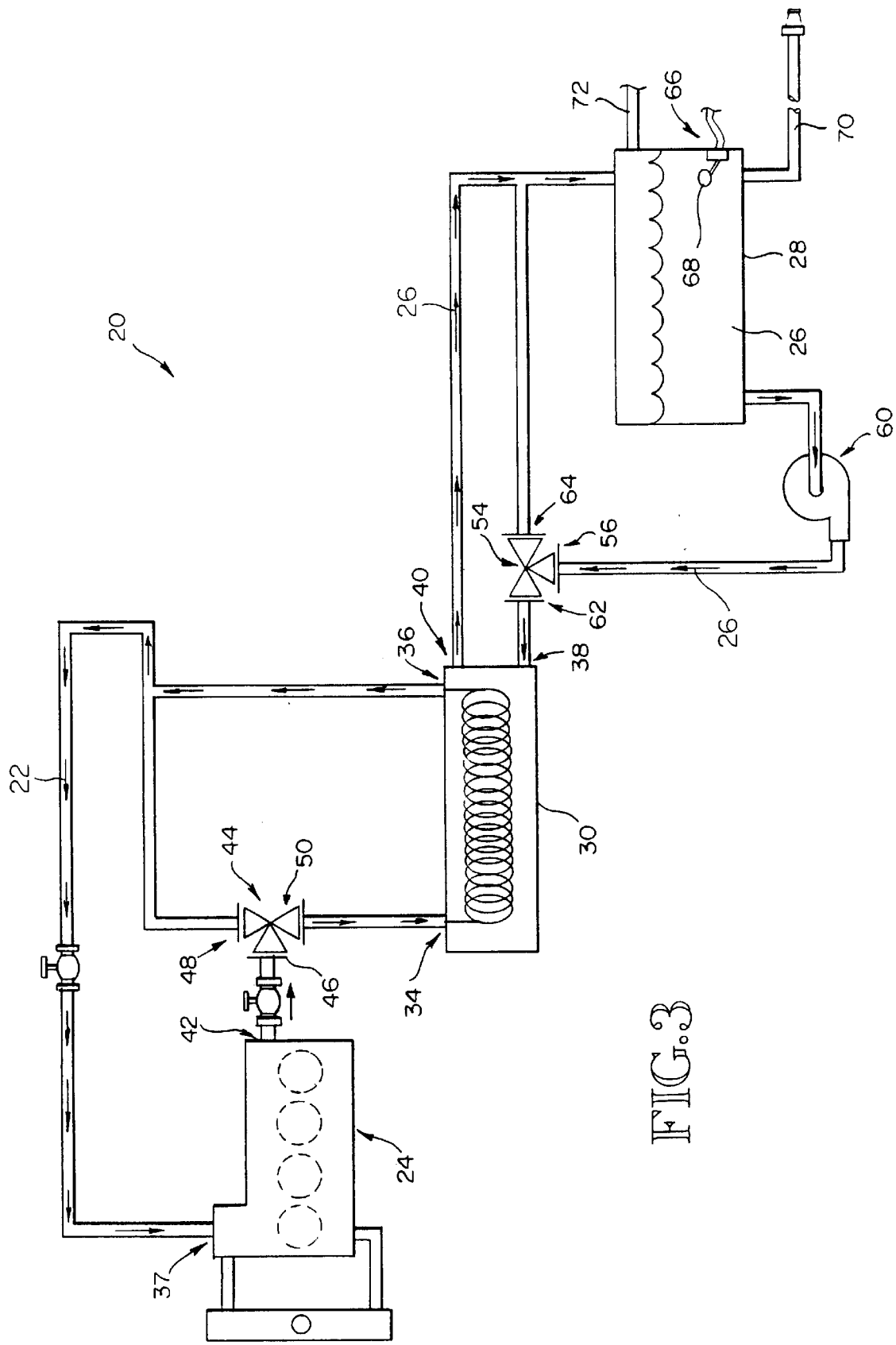
FIG. 3 is a simplified schematic view illustrating the operation of a waste heat auxiliary tank system after the engine is warmed-up and at operating temperature, the arrows indicating the direction of fluid flow. In this situation engine coolant flows from the engine through a diverter valve having a fully open thermostat which causes coolant to flow through the second outlet port to the coolant inlet of the heat exchanger. Also, process water is pumped from the auxiliary water storage tank through a second diverter valve through the heat exchanger, and from there back to the auxiliary water storage tank.

FIG. 3 illustrates the flow of coolant 22 after the engine 24 is warmed-up and at operating temperature. In this situation, coolant 22 flows from the engine 24 through diverter valve 44 having a fully open thermostat (not illustrated), wherein coolant 22 flows through the second outlet port 50 to the coolant inlet 34 of the heat exchanger 30. Further, the flow of process water 26 is unchanged because at this stage, heat is still being transferred thereto.

Figure 4:
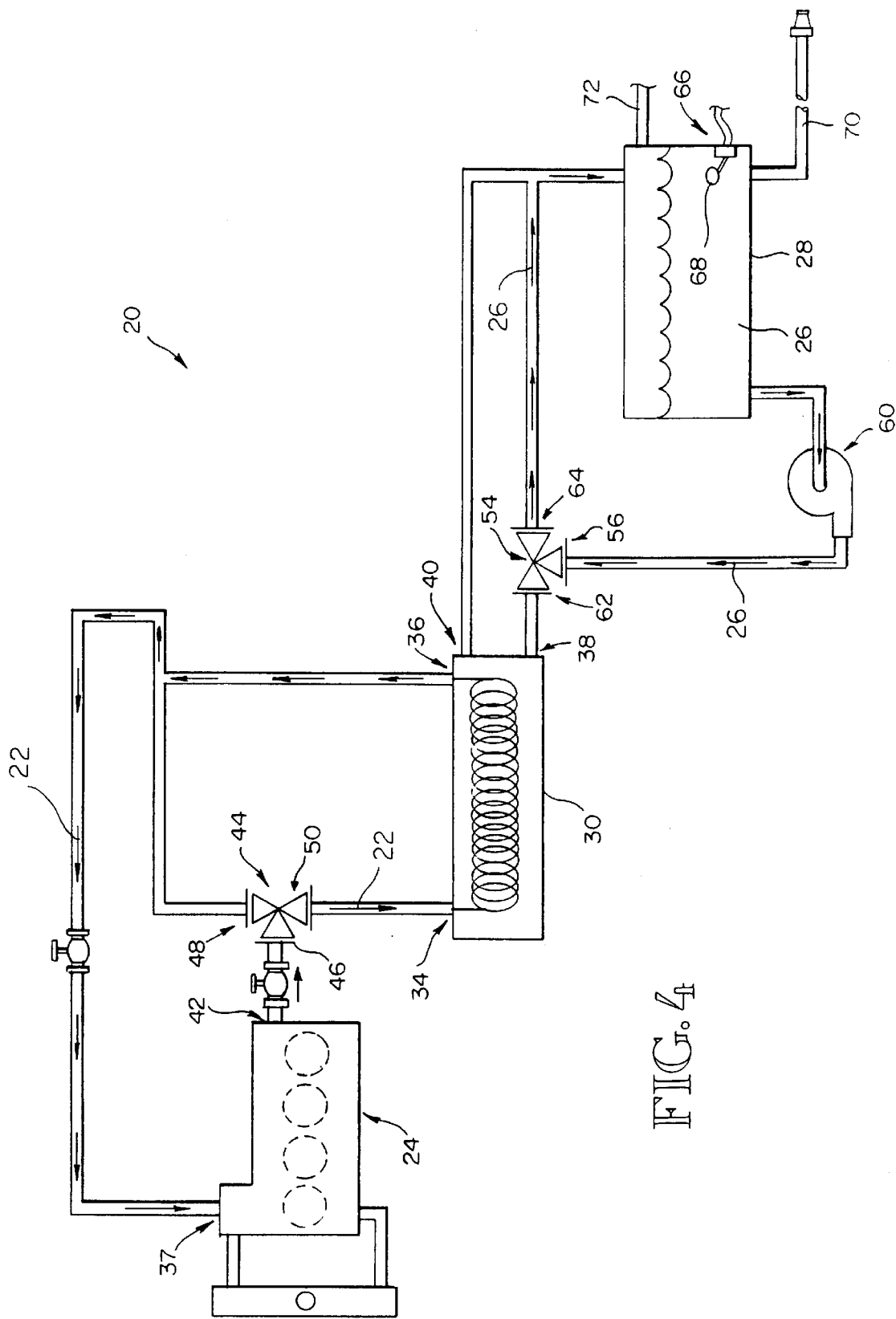
FIG. 4 is a simplified schematic view illustrating the operation of a waste heat auxiliary tank system after the engine is warmed-up and at operating temperature, the arrows indicating the direction of fluid flow. In this situation, engine coolant flows from the engine through a diverter valve having a fully open thermostat which causes coolant to flow through the second outlet port to the coolant inlet of the heat exchanger. Also, process water is pumped from the auxiliary water storage tank through the second outlet port of a second diverter valve such that the process water bypasses the heat exchanger and is directed back to the auxiliary water storage tank.

FIG. 4 illustrates the flow of process water after the engine 24 is warmed-up and at operating temperature, and after the process water has reached its preferred temperature. Specifically, coolant 22 flows from the engine 24 through a diverter valve having a fully open thermostat (not illustrated), wherein coolant 22 flows through the second outlet port 50 to the coolant inlet 34 of the heat exchanger 30. However, process water 26 is pumped from the auxiliary storage tank 28 through the second diverter valve 54 such that the process water 26 flows through the second outlet port 50, bypassing the heat exchanger 30 where it is directed back to the auxiliary water storage tank 28.

Figure 5:
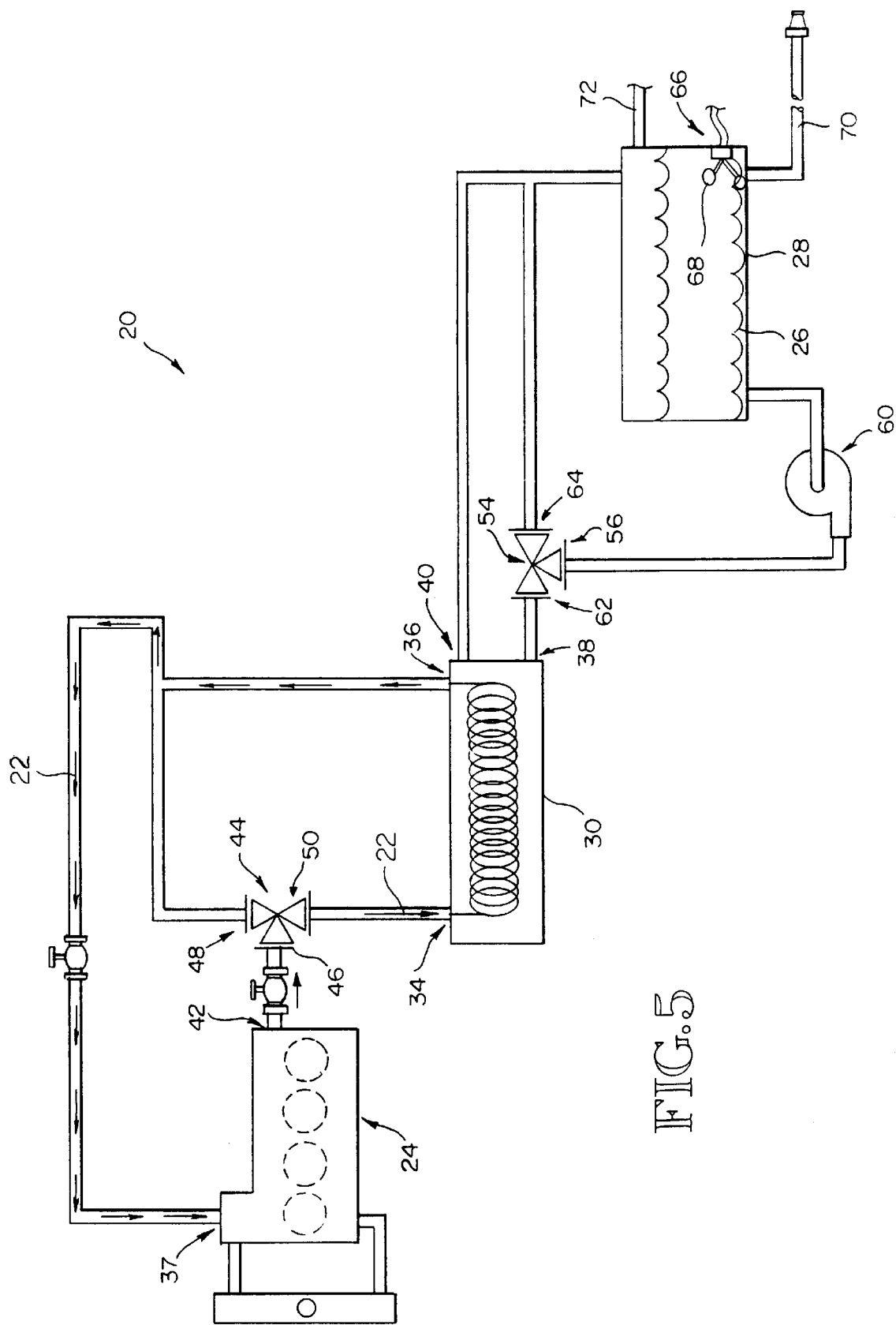
FIG. 5 is a simplified schematic view illustrating the operation of a waste heat auxiliary tank system after the engine is warmed-up and at operating temperature, the arrows indicating the direction of fluid flow. In this situation, engine coolant flows from the engine through a diverter valve having a fully open thermostat, which causes coolant to flow through the second outlet port thereof to the coolant inlet of the heat exchanger. However, the flow of process water is terminated by activation of a low water level cutoff switch activated because of a low process water level.

FIG. 5 is provided to illustrate the termination of flow of process water 26 when the level thereof in the auxiliary water tank 28 drops to a minimum acceptable level. This situation can occur when the user consumes the process water 26: For example when hot water is used to clean concrete equipment on a concrete delivery truck. The flow of process water 26 is terminated by activation of a low water level cutoff switch 66 activated because of a low level of process water 26. It should be noted that the cutoff switch 66 could be of the type that is responsive to a float 68 that moves vertically responsive to the level of process water 26. Moreover, the cutoff switch is an optional item that would only be installed at the user's discretion.

Figure 6:
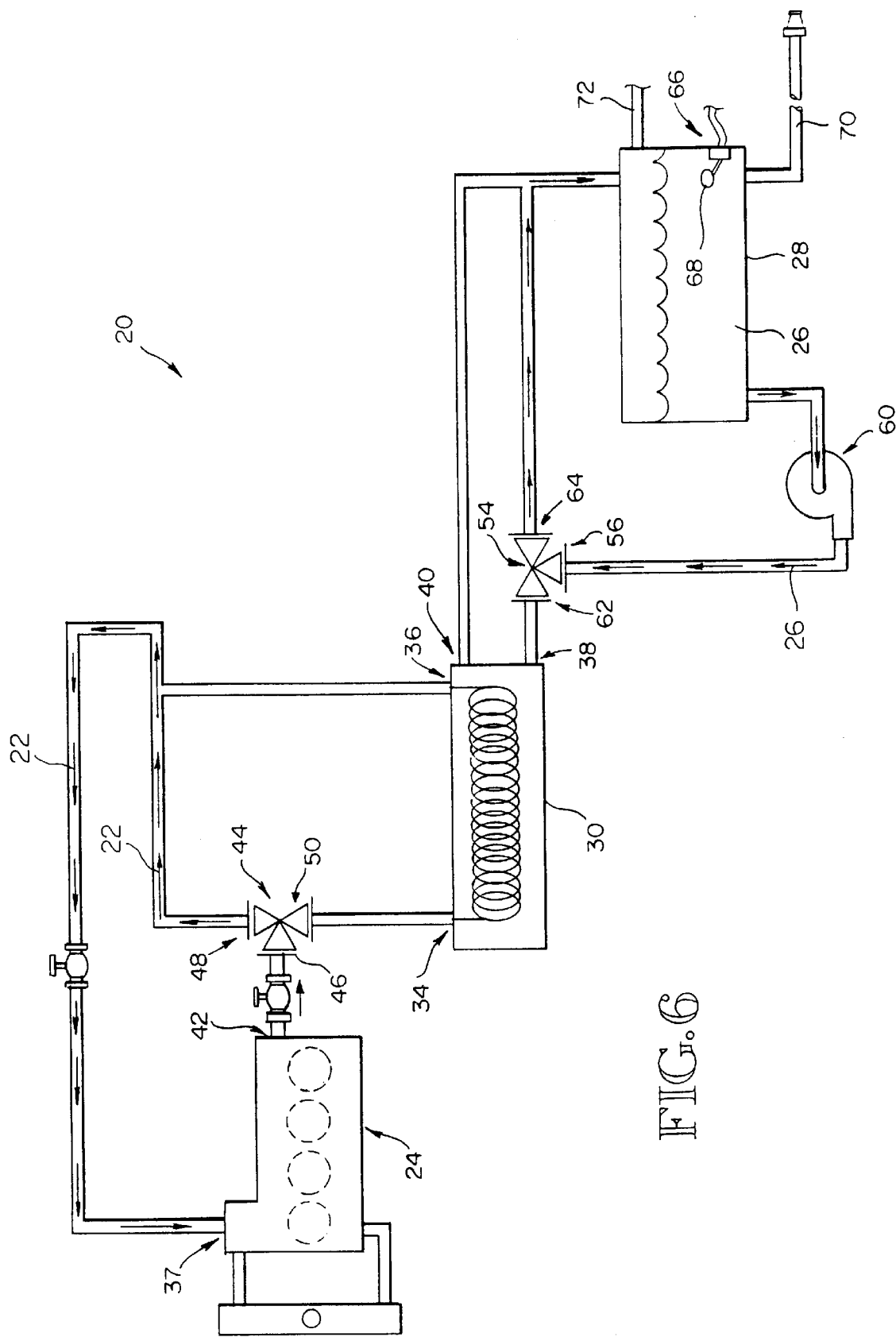
FIG. 6 is a simplified schematic view illustrating the operation of a waste heat auxiliary tank system during the engine warmed-up period, the arrows indicating the direction of fluid flow. In this situation, engine coolant flows from the engine through a diverter valve having a closed thermostat which causes coolant to flow through the first outlet port back to the engine. Also, process water is pumped from the auxiliary storage tank through a second diverter valve such that the process water bypasses the heat exchanger and is directed back to the auxiliary water storage tank.

FIG. 6 illustrates the situation where the process water temperature has reached the preferred temperature but the engine 24 is cycling through a warmed-up period. In this situation, coolant 22 flows from the engine through diverter valve 44 having a closed thermostat (not illustrated), wherein coolant 22 flows through the first outlet port 48 back to the engine 24. In addition, process water 26 is pumped from the auxiliary water storage tank 28 through a second diverter valve 54 such that the process water 26 bypasses the heat exchanger 30 and is directed back to the auxiliary water storage tank 28.

It should be understood that the above noted waste heat auxiliary tank system 20 can be adapted to work with most any water cooled internal combustion engine. One method of "tying-in" to such engines is to tap into an existing heater inlet which acts as the engine coolant inlet 37. Similarly, tapping into the existing heater outlet provides the engine coolant outlet 42. With this arrangement, the engine coolant inlet 37 is disposed on the suction side of the engine block. Conversely, the engine coolant outlet 42 is disposed on the pressure side of the engine block.

Figure 7:
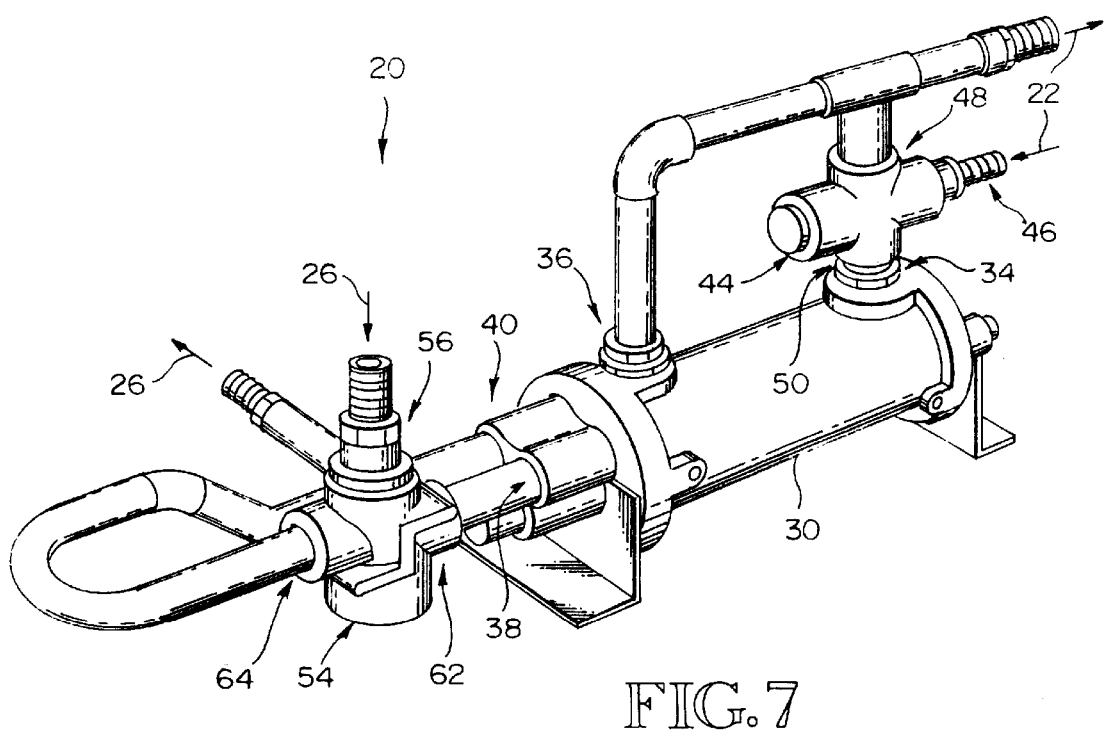
FIG. 7 is a perspective view illustrating a pair of diverter valves mounted to a heat exchanger in accordance with the present invention.

Directing attention to FIG. 7 a preferred embodiment waste heat auxiliary tank system is illustrated. It should be understood that, in accordance with the present invention, the pair of diverter valves are mounted to the heat exchanger by common, readily available copper pipe and copper fittings in a conventional manner. However, the same arrangement of components could be achieved with other types of fittings and piping components without any adverse effect on the system.

In addition to the above, in the preferred embodiment, all hook-ups to and from the engine 24, for the transport of fluids, is accomplished by the use of common, readily available high temperature radiator hose. Additionally, in the preferred embodiment, the flow of coolant through diverter valve 44, and the flow of process water 26 through the second diverter valve 54 is continuous and uninterrupted which enables continuous automatic operation of the waste heat auxiliary tank system 20.

Finally, it should be noted that the user (not illustrated) of the waste heat auxiliary tank system 20 receives process water 26 through a pressure hose 70 that typically extends from the auxiliary water storage tank 28. For this purpose, air pressure is applied to the interior of the auxiliary water storage tank 28. One common source of such air pressure is obtained from air produced to run accessories on trucks. Accordingly, an air supply hose 72 can be connected to the auxiliary water storage tank 28 to provide such pressure. However, with the application of such pressure, all components within the process water 26 "loop" must be able to withstand high pressure, including the heat exchanger 30, and the auxiliary water storage tank 28.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A waste heat auxiliary tank system for transferring heat from the coolant of an internal combustion engine to process water contained in an auxiliary water storage tank, the waste heat auxiliary tank system comprising:

a heat exchanger having:
   a coolant inlet for receiving coolant at a predetermined temperature;
   a coolant outlet for discharging the coolant for return to the engine;
   a process water inlet for receiving process water from the auxiliary water storage tank; and
   a process water outlet for discharging process water for return to the auxiliary water storage tank;

an automatically activated multi-port thermostatically controlled diverter valve having an inlet port for receiving coolant from the engine, a first outlet port for diverting coolant directly back to the engine, and a second outlet port for diverting coolant to the coolant inlet of said heat exchanger, wherein the flow of coolant from the engine to the diverter valve is continuous;

the diverter valve being responsive to coolant temperature changes relative to a predetermined engine operating temperature such that when the coolant temperature is below the predetermined operating temperature coolant is directed out the first outlet port, back to the engine; and such that when the coolant temperature is above the predetermined operating temperature, coolant is directed out the second outlet port, to the heat exchanger coolant inlet;

a liquid pump for pumping process water from the auxiliary water storage tank;

a second automatically activated multi-port thermostatically controlled diverter valve having an inlet port for receiving a continuous flow of process water from the liquid pump, a first outlet port for diverting process water to the process water inlet of the heat exchanger, and a second outlet port for diverting process water back to the auxiliary water storage tank; and the second diverter valve being responsive to process water temperature changes relative to a predetermined temperature such that when the process water temperature is below the predetermined temperature, process water is directed out the first outlet port, to the heat exchanger; and such that when the process water temperature is above the predetermined temperature, process water is directed out the second outlet port, back to the auxiliary water storage tank.

2. A waste heat auxiliary tank system for transferring heat from the coolant of an internal combustion engine to process water contained in an auxiliary water storage tank, the waste heat auxiliary tank system comprising:

a heat exchanger having:
   a coolant inlet for receiving coolant at a predetermined temperature;
   a coolant outlet for discharging the coolant for return to the engine;
   a process water inlet for receiving process water from the auxiliary water storage tank; and
   a process water outlet for discharging process water for return to the auxiliary water storage tank;

an automatically activated multi-port thermostatically controlled diverter valve having an inlet port for receiving coolant from the engine, a first outlet port for diverting coolant directly back to the engine, and a second outlet port for diverting coolant to the coolant inlet of said heat exchanger;

the diverter valve being responsive to coolant temperature changes relative to a predetermined engine operating temperature such that when the coolant temperature is below the predetermined operating temperature, coolant is directed out the first outlet port, back to the engine; and such that when the coolant temperature is above the predetermined operating temperature, coolant is directed out the second outlet port, to the heat exchanger coolant inlet;

a second automatically activated multi-port thermostatically controlled diverter valve having an inlet port for receiving a continuous flow of process water from the auxiliary water storage tank, a first outlet port for diverting process water to the process water inlet of the heat exchanger, and a second outlet port for diverting process water back to the auxiliary water storage tank; and the second diverter valve being responsive to process water temperature changes relative to a predetermined temperature such that when the process water temperature is below the predetermined temperature, process water is directed out the first outlet port, to the process water inlet of the heat exchanger; and such that when the process water temperature is above the predetermined temperature, process water is directed out the second outlet port, back to the auxiliary water storage tank.

3. A waste heat auxiliary tank system as recited in claim 2 wherein the flow of coolant from the engine to the diverter valve is continuous.

4. A waste heat auxiliary tank system as recited in claim 3 further comprising a liquid pump for pumping process water from the auxiliary water storage tank to the inlet port of the second diverter valve.

5. A waste heat auxiliary tank system for transferring heat from the coolant of an internal combustion engine to process water contained in an auxiliary water storage tank, the waste heat auxiliary tank system comprising:

a heat exchanger having:
  a coolant inlet for receiving coolant at a predetermined temperature;
  a coolant outlet for discharging the coolant for return to the engine;
  a process water inlet for receiving process water from the auxiliary water storage tank; and
  a process water outlet for discharging process water for return to the auxiliary water storage tank;

an automatically activated multi-port thermostatically controlled diverter valve having an inlet port for receiving coolant from the engine, a first outlet port for diverting coolant directly back to the engine, and a second outlet port for diverting coolant to the coolant inlet of said heat exchanger;

the diverter valve being responsive to coolant temperature changes relative to a predetermined engine operating temperature such that when the coolant temperature is below the predetermined operating temperature coolant is directed out the first outlet port, back to the engine; and such that when the coolant temperature is above the predetermined operating temperature, coolant is directed out the second outlet port, to the heat exchanger coolant inlet;

a second automatically activated multi-port thermostatically controlled diverter valve having an inlet port for receiving a continuous flow of process water from the auxiliary water storage tank, a first outlet port for diverting process water to process water inlet of the heat exchanger, and a second outlet port for diverting process water back to the auxiliary water storage tank; and the second diverter valve being responsive to process water temperature changes relative to a predetermined temperature such that when the process water temperature is below the predetermined temperature, process water is directed out the first outlet port, to the process water inlet of the heat exchanger; and such that when the process water temperature is above the predetermined temperature, process water is directed out the second outlet port, back to the auxiliary water storage tank.

6. A waste heat auxiliary tank system as recited in claim 5 further comprising a liquid pump for pumping process water from the auxiliary water storage tank to the inlet port of the second diverter valve.

7. A waste heat auxiliary tank system as recited in claim 5 wherein the flow of coolant from the engine to the diverter valve is continuous.

8. A waste heat auxiliary tank system as recited in claim 5 wherein a low water level cutoff switch is disposed within the auxiliary water storage tank to terminate the flow of process water when the level thereof falls below a predetermined level.

9. A method for making a waste heat auxiliary tank system for transferring heat from the coolant of an internal combustion engine to process water contained in an auxiliary water storage tank, the method comprising the steps:

providing a heat exchanger having:
  a coolant inlet for receiving coolant at a predetermined temperature;
  a coolant outlet for discharging the coolant for return to the engine;
  a process water inlet for receiving process water from the auxiliary water storage tank; and
a process water outlet for discharging process water for return to the auxiliary water storage tank;

providing an automatically activated multi-port thermostatically controlled diverter valve having an inlet port for receiving coolant from the engine, a first outlet port for diverting coolant directly back to the engine, and a second outlet port for diverting coolant to the coolant inlet of said heat exchanger;

the diverter valve being responsive to coolant temperature changes relative to a predetermined engine operating temperature such that when the coolant temperature is below the predetermined operating temperature, coolant is directed out the first outlet port, back to the engine; and such that when the coolant temperature is above the predetermined diverting temperature, coolant is directed out the second outlet port, to the coolant inlet of the heat exchanger;

providing a second automatically activated multi-port thermostatically controlled diverter valve having an inlet port for receiving a continuous flow of process water from the auxiliary water storage tank, a first outlet port for diverting process water to the process water inlet of the heat exchanger, and a second outlet port for diverting process water back to the auxiliary water storage tank; and the second diverter valve being responsive to process water temperature changes relative to a predetermined temperature such that when the process water temperature is below the predetermined temperature, process water is directed out the first outlet port, to the process water inlet of the heat exchanger; and such that when the process water temperature is above the predetermined temperature, process water is directed out the second outlet port, back to the auxiliary water storage tank.

10. A method for making a waste heat auxiliary tank system as recited in claim 9, the method further comprising the step of providing a liquid pump for pumping process water from the auxiliary water storage tank to the inlet port of the second diverter valve.

11. A method for making a waste heat auxiliary tank system as recited in claim 10, wherein the flow of coolant from the engine to the diverter valve is continuous, and wherein the flow of process water from the auxiliary water storage tank to the second diverter valve is continuous.

12. A method for making a waste heat auxiliary tank system as recited in claim 10, the method further comprising the step of providing a low water level cutoff switch disposed within the auxiliary water storage tank to terminate the flow of process water when the level thereof falls below a predetermined level.

* * * * *